United States Patent
Finello et al.

(10) Patent No.: US 6,454,815 B1
(45) Date of Patent: Sep. 24, 2002

(54) ALKALINE ELECTROCHEMICAL CAPACITOR AND ELECTRODE FABRICATION

(75) Inventors: Duane Finello, Shalimar; Scott L. Roberson, Destin, both of FL (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/656,197

(22) Filed: Sep. 6, 2000

Related U.S. Application Data

(62) Division of application No. 09/251,512, filed on Feb. 17, 1999, now Pat. No. 6,181,547.
(60) Provisional application No. 60/097,528, filed on Aug. 12, 1998.

(51) Int. Cl.$^7$ .............................. H01G 9/00; H01M 4/02; C22B 34/14; C22B 5/20
(52) U.S. Cl. .......................... 29/25.03; 75/612; 75/343; 429/209
(58) Field of Search .......................... 29/25.01–25.03; 361/500–504, 520; 75/612, 331, 343; 429/208–211

(56) References Cited

U.S. PATENT DOCUMENTS

| | | | | |
|---|---|---|---|---|
| 4,060,476 A | * | 11/1977 | Treptow et al. | 204/290 |
| 4,517,069 A | * | 5/1985 | Harney et al. | 204/290 |
| 4,517,727 A | * | 5/1985 | Shimizu et al. | 29/570 |
| 5,144,537 A | | 9/1992 | Tsuchiya et al. | |
| 5,168,433 A | | 12/1992 | Mukouyama et al. | |
| 5,303,118 A | | 4/1994 | Saito et al. | |
| 5,526,223 A | * | 6/1996 | Wu et al. | 361/508 |
| 5,626,729 A | | 5/1997 | Thompson et al. | |
| 5,680,292 A | | 10/1997 | Thompson, Jr. et al. | |
| 5,768,090 A | | 6/1998 | Li et al. | |
| 5,834,840 A | * | 11/1998 | Robbins et al. | 257/705 |

FOREIGN PATENT DOCUMENTS

JP     75015286    * 6/1975

* cited by examiner

Primary Examiner—Ha Tran Nguyen
(74) Attorney, Agent, or Firm—Richard A. Lambert; Bobby D. Scearce; Thomas L. Kundert

(57) ABSTRACT

A high power density alkaline electrochemical capacitor cell includes a pair of titanium nitride powder electrodes fabricated by subjecting titanium hydride powder to a controlled flow of ammonia vapor. A porous separating membrane for containing an electrolyte is attached to a first surface of the pair of powder electrodes. A conductive termination is attached to the second side of each of the powder electrodes. The electrodes have a high surface area and are electrochemically stable in strong alkaline electrolyte. The capacitor cell can be hermetically sealed and is capable of long-term cyclical operation over a wide range of operating temperatures (−55° C. to +100° C.) while providing high-density energy storage.

21 Claims, 1 Drawing Sheet

ALKALINE ELECTROCHEMICAL CAPACITOR AND ELECTRODE FABRICATION

This application is a division of U.S. application Ser. No. 09/251,512, filed Feb. 17, 1999, U.S. Pat. No. 6,181,547, which claims priority on prior Provisional Application No. 60/097,528, filed Aug. 12, 1998, entitled Alkaline Electrochemical Capacitor And Electrode Fabrication.

RIGHTS OF THE GOVERNMENT

The invention described herein may be manufactured and used by or for the Government of the United States for all governmental purposes without the payment of any royalty.

BACKGROUND OF THE INVENTION

The present invention relates generally to electrochemical energy storage devices and more specifically to alkaline electrochemical capacitors incorporating high surface area electrodes.

The desirability and utility of providing efficient electrical energy storage devices is well known. As technological advances continue, more and more products and devices rely on an efficient, economical supply of electrical energy for operation. Moreover, as those products are refined and often miniaturized, the desirability for an efficient, compact, high powered energy storage device becomes even greater.

Generally, in order to maintain or increase the electrical energy output of a storage device while simultaneously decreasing its size, the energy density (energy per unit volume) of the device must be increased. The electrochemical energy in a storage device such as an electrochemical capacitor depends on the total electrode surface area which is in contact with the electrolyte. Accordingly, one way to increase the energy available without increasing the physical size of the device is to increase the surface area of the electrodes. Further, the ionic conductivity or activity of the electrolyte can be increased to enhance power output. But, as known to those skilled in the art, the higher activity electrolyte solutions can lead to decay of the electrode material.

In addition to the desirability of providing a storage device having small physical size and high-energy output, is the desirability of providing a sealed, environmentally stable energy storage device. An advantage to such a device would lie in its ability to be manufactured as a sealed package, facilitating its incorporation into larger systems and high reliability products.

Varied configurations of high-density energy storage devices have been developed to date. As an example, U.S. Pat. No. 5,626,729 to Thompson et al. entitled "Modified Polymer Electrodes for Energy Storage Devices and Method of Making Same" discloses an electrochemical capacitor utilizing non-noble metal substrates upon which a nitride layer is formed. An electrochemically stable pseudocapacitive polymer coating is deposited on the nitride layer and an electrolyte disposed in-between. A limitation inherent in this device is that the chemically doped polymers incorporated therein tend to suffer progressive decay when used in electrolyte solutions strong enough to provide the high power density desired from capacitors.

U.S. Pat. No. 5,680,292 to Thompson, Jr. et al. entitled "High Surface Area Nitride, Carbide and Boride Electrodes and Methods of Fabrication Thereof" discloses high surface area electrodes wherein a conductive ceramic coating is formed on a molybdenum, tungsten or vanadium metal substrate. A separator is impregnated with an acidic ionically conductive electrolytic solution such as aqueous sulfuric acid. The electrodes pertinent to such processing methods are electrochemically unstable in strong alkaline electrolyte. These electrodes would act as passive electrical insulators in an alkaline electrolyte upon application of a small (half-volt) positive charge, thus precluding their use in alkaline capacitors.

An example of a commercially available device is the capattery manufactured by the Evans Capacitor Company, East Providence, R.I. The capattery is a capacitor incorporating carbon powder electrodes in conjunction with a sulfuric acid electrolyte. Although this type of capacitor has been useful in certain applications, it suffers from the limitation that carbon dioxide gas is released as a byproduct of the charge/discharge cycling and must be vented. As a result, the capacitor package can't be hermetically sealed. Moreover, since the upper operating temperature limit is 85° C. and since the device must be vented, it would fail by drying out when exposed to temperatures exceeding its operational limit.

A need exists therefore for an improved high-density electrical energy storage device. Such a device would be compact, capable of being hermetically sealed and fabricated from readily available materials and processes.

It is therefore a primary object of the present invention to provide an electrical energy storage device overcoming the limitations and disadvantages of the prior art.

It is still another object of the present invention to provide an electrochemical capacitor that takes advantage of the desirable qualities of strong alkaline electrolyte solutions to provide high energy density deliverable at high power density.

It is yet another object of the present invention to provide an electrochemical capacitor that is sealed and capable of long-term cyclic operation over a wide range of operating temperatures.

These and other objects of the invention will become apparent as the description of the representative embodiments proceeds.

SUMMARY OF THE INVENTION

In accordance with the foregoing principles and objects of the invention, a high-density alkaline electrochemical capacitor and method of fabrication is described. The method of the present invention includes fabricating a pair of titanium powder electrodes. In the preferred embodiment, the powder electrode is comprised of titanium nitride powder obtained by reacting titanium hydride powder with a controlled flow of ammonia gas for one hour at a temperature of 700° C. Alternatively, the powder electrode can be obtained by reacting titanium nitride powder with ionized ammonia. This reaction can be completed at room temperature. Advantageously, the titanium nitride electrodes, by virtue of their powder composition, have a high surface area, greatly enhancing the overall operation of the capacitor cell.

A porous separating membrane for containing an electrolyte is affixed between the pair of titanium nitride powder electrodes. In the preferred embodiment, the electrolyte solution is 7.6M (14.7 pH) potassium hydroxide. Advantageously, this strong alkaline electrolyte helps provide the desirable high-density energy storage quality of the capacitor cell fabricated according to the method of the present invention.

The capacitor cell is capped or sealed by a pair of conductive titanium nitride terminations. In the preferred embodiment, these terminations are fabricated by heating a thermoplastic elastomer to a temperature sufficient to melt and adding finely ground titanium nitride or titanium carbonitride powder thereto. Alternatively, these terminations may be fabricated by dissolution of a solvent processable elastomer, which is allowed to cure following addition of fine particulate titanium nitride or carbonitride. Such conductive elastomeric terminations perform the dual function of sealing the capacitor as well as being electrically conductive so as to facilitate the ready transference of electrical energy into and out of the capacitor cell. The cell conductivity may be further enhanced by RF magnetron sputter coating of the conductive elastomer with titanium nitride or carbonitride.

Advantageously, this capacitor cell construction, by making use of the alkaline electrolyte, facilitates cyclic operation without any release of gaseous byproducts. This permits hermetic sealing of the capacitor thereby contributing to highly reliable device operation and longevity by preventing dry out of the electrolyte solution. It renders this capacitor capable of long-term cyclical operation over a wide range of operating temperatures (−55° C. to +100° C.) while providing high-density energy storage. Moreover, by virtue of its being hermetically sealed, and the attendant long-term cyclic operation, this capacitor can be permanently incorporated into a vast array of devices without concern for routine replacement. As can be appreciated, this contributes to enhanced system reliability as well as reduced operational costs.

BRIEF DESCRIPTION OF THE DRAWING

The accompanying drawing incorporated in and forming a part of the specification, illustrates several aspects of the present invention and together with the description serves to explain the principles of the invention. In the drawing.

DETAILED DESCRIPTION OF THE INVENTION

Figure 1:
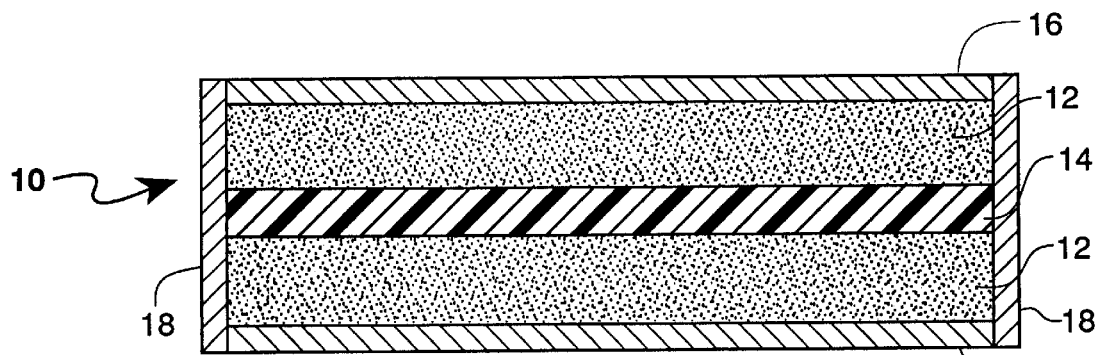
FIG. 1 is a sectional view of a capacitor cell constructed according to the method of the present invention.

Reference is now made to FIG. 1 showing an alkaline electrolyte capacitor cell 10 fabricated according to the method of the present invention. The method of the present invention includes fabricating a pair of powder electrodes 12. As will be described in more detail below, the powder electrodes produced according to the method of the present invention can be any titanium compound from the group of titanium nitride (TiN), titanium (Ti), titanium carbonitride (TiCN), titanium hydride (TiH$_2$), titanium suboxides (Ti$_4$O$_7$ and Ti$_5$O$_9$), and titanium oxynitride (TiON). Since titanium nitride has the highest conductivity of the group, it will often be the desired compound of choice.

According to the method of the present invention, the powdered high surface area titanium compounds are derived via decomposition of titanium hydride at temperatures in the range of 400° C. to 1100° C. The titanium nitride powder is formed by exposing titanium hydride to a controlled flow of ammonia vapor for one hour at 700° C. The reaction is described as:

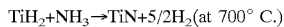

For ammonia flow rates greater than 2 liters per minute, (using a ten-gram quantity of titanium hydride), titanium nitride is the reaction product. For ammonia flow rates less than 1 liter per minute, the other titanium compounds listed above formed.

Alternatively, the titanium nitride powder can be derived by exposing titanium hydride powder to a controlled flow of ionized ammonia vapor for one hour at room temperature. The reaction is described as:

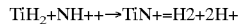

The granules can be shaken during the reaction process, if desired, in order to ensure that all sides of the powder granules are completely exposed. As can be appreciated, the titanium hydride powder can also be reacted with the ionized ammonia at elevated temperatures, accelerating the reaction and reducing the reaction time. For example, it has been determined that reacting the titanium hydride powder with the ionized ammonia at 400° C. converts the titanium hydride powder to titanium nitride in half the time that it takes to convert the titanium hydride powder at 700° C. in the presence of ammonia vapor as described above.

The ionized ammonia can be obtained by transferring radio frequency (RF) energy to the ammonia gas at approximately 10% to 15% that of atmospheric pressure via either inductive or capacitive coupling. Using an appropriate RF impedance matching network, ammonia gas ionization can be achieved with either a coil consisting of several turns of copper tubing or with a pair of evenly spaced metal plates.

The titanium nitride powder thus obtained can be then formed into a planar configuration so as to produce the desired powder electrodes 12. A porous separating membrane 14 is then attached to a pair of electrodes 12 on a first surface respectively. The membrane 14 is porous for receiving the alkaline electrolyte solution and is also chosen from the class of materials demonstrated to be compatible therewith. Thus, the porous separating membrane 14 is made from polypropylene, polyethylene or polyamide (nylon) and is approximately 1 mil thick. The membrane 14 is attached to the electrodes 12 via an ultrasonic weld process or by the use of a benzene based solvent glue.

The alkaline electrolyte of the preferred embodiment is an aqueous 7.6 M (14.7 pH) potassium hydroxide solution. Other alkaline electrolyte solutions in the range of 7 pH–15 pH will also provide the desired high-density energy storage.

The capacitor cell 10 is capped or sealed by affixing a conductive titanium nitride termination 16 on the second side of each powder electrode 12. The conductive terminations 16 perform the dual function of sealing the capacitor as well as being electrically conductive so as to facilitate the ready transference of electrical energy into and out of the capacitor. As can be appreciated, several capacitor cells 10 formed by the method of the present invention can be easily connected in series by simply stacking one on another. In the preferred embodiment, the terminations 16 are fabricated by heating a thermoplastic elastomer to its melting temperature and adding finely ground titanium nitride or titanium carbonitride powder thereto.

Alternatively, terminations 16 may be fabricated by dissolution of a solvent processible elastomer which is allowed to cure following addition of fine particulate titanium nitride or titanium carbonitride. Choices of material include polypropylene, polyethylene, polyamide, silicon rubber, graphitized rubber and neoprene rubber. The cell conductivity may be further enhanced, if desired, by RF magnetron sputter coating of the conductive elastomer with titanium nitride or carbonitride. As an alternative, the terminations 16 can be fabricated from titanium nitride or titanium carbonitride coated metal.

Finally, a sidewall 18 encloses the edges of the capacitor cell 10, advantageously providing for the construction of a sealed device. In the preferred embodiment, the sidewall 18 is fabricated from the group of polyethylene, polypropylene, polyamide, silicon rubber and neoprene rubber and provides the dual function of retaining the electrolyte solution within the porous separating membrane 14 as well as electrically insulating the capacitor cell 10 from the adjacent environment. The sidewall 18 is attached via an ultrasonic weld process or by the use of a benzene based solvent glue.

As an example, a ten-gram sample of titanium hydride (99% pure, 325 mesh powder) was placed in a shallow stainless steel tray in a split core tube furnace and thoroughly dried at 175° C. for two hours in 99.97% pure nitrogen gas at controlled flow rate (2 l/min). Thermal exposure was performed in 99.99% pure anhydrous ammonia at controlled flow rate (2 l/min) using a ramp-up temperature profile which increased the specimen temperature to 700° C. within two hours. Without interrupting the controlled flow of anhydrous ammonia, the temperature was held at 700° C. for two additional hours, followed by cooling to room temperature within one hour. In this manner, high surface area titanium nitride powder was formed.

A small (one-inch diameter) circular piece of 40% porous polypropylene membrane (Celgard 3400, 40 nm average pore diameter) was epoxied between a pair of rubber gaskets of 0.625-inch inner diameter. A sample (several milligrams) of the high surface area titanium nitride powder was placed into one side of the gasket/membrane assembly, and it was plugged with a nitrided disk of titanium metal of 2-millimeter thickness. An equal amount of powder was placed into the other side of the assembly in the same manner. After wetting this powder with 7.6 M (14.7 pH) potassium hydroxide solution, this side of the assembly was similarly plugged with a disk of nitrided titanium metal. The alkaline electrolyte was allowed to wick evenly across the membrane within the assembly.

Figure 2:
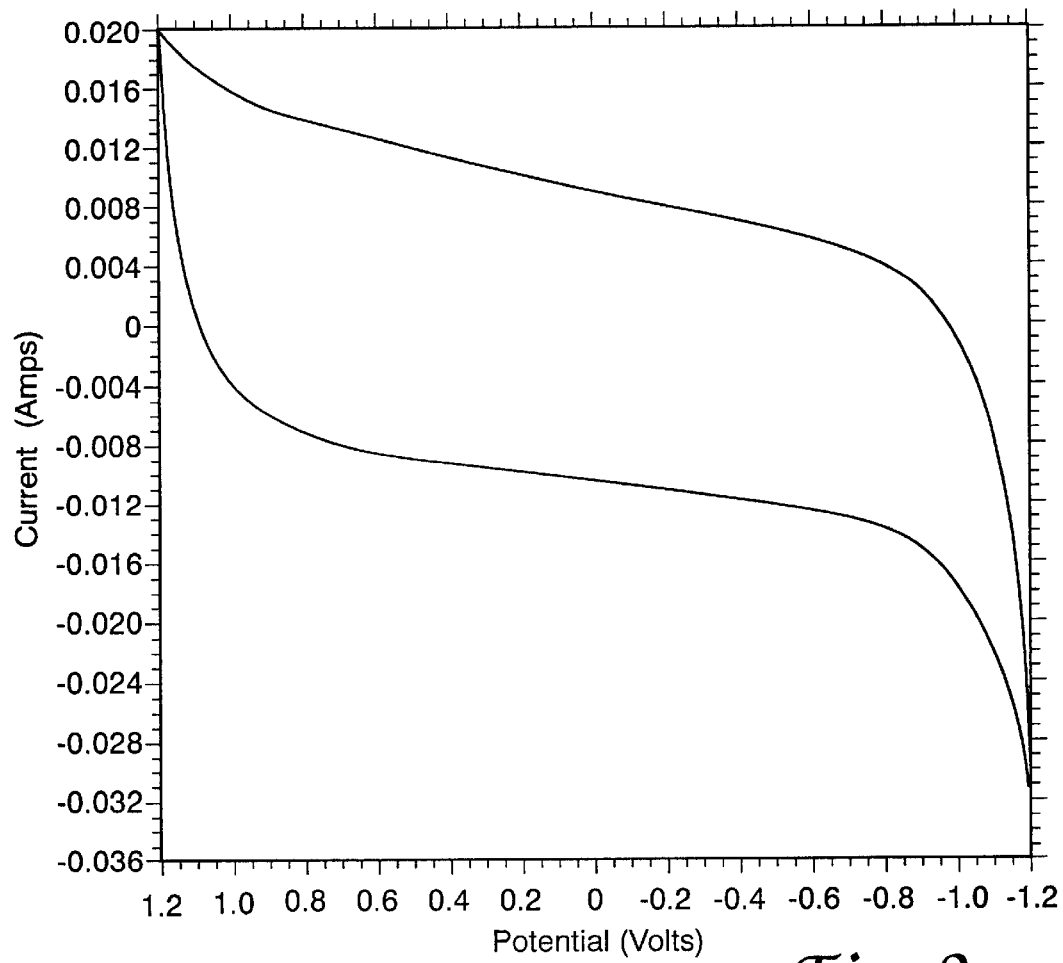
FIG. 2. is a graph of cyclic voltammetry data obtained from the operation of a capacitor cell constructed according to the method of the present invention.

The internal resistance was measured to be 0.47Ω and the capacitance was 0.25 farad. With a specific capacitance of 125 mF/cm$^2$, an alkaline capacitor cell 10 fabricated according to the method of the present invention offers a capacitive energy density of 312 mJ/cc based upon the volume of active material. In addition, no loss in performance was observed upon operation at 90° C. temperature, and as shown in FIG. 2, electrochemical stability was maintained over the bipolar potential window of 1.2 volts.

In summary, numerous benefits have been described from the principles of the present invention. The high power density alkaline electrolyte capacitor cell 10 fabricated according to the method of the present invention, provides for high density energy storage over a wide range of operating temperatures (−55° C. to +100° C.) and is capable of long-term cyclic operation. By virtue of is strong alkaline electrolyte solution, the capacitor cell 10 can be hermetically sealed, facilitating its incorporation into a vast array of products and devices.

The foregoing description of the preferred embodiment has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the inventions in various embodiments and with various modifications as are suited to the particular scope of the invention as determined by the appended claims when interpreted in accordance with the breadth to which they are fairly, legally and equitably entitled.

We claim:

1. A method of fabricating a high density powder electrode comprising the steps of:
   creating a titanium compound powder by subjecting powdered titanium hydride to a flow of ammonia vapor at a controlled flow rate;
   forming said titanium compound powder into an electrode;
   attaching a conductive termination to said electrode.

2. The method of claim 1 wherein said powdered titanium hydride is heated to a temperature above 400° C. while subjecting said powdered titanium hydride to said flow of ammonia vapor.

3. The method of claim 2 wherein said temperature is within the range of about 400° C. to 1100° C.

4. The method of claim 1 wherein said ammonia vapor is ionized ammonia vapor.

5. The method of claim 4 wherein said flow of ammonia is about 2 liters per minute per ten-gram quantity of said titanium powder.

6. The method of claim 1 wherein said flow of ammonia is about 2 liters per minute per ten-gram quantity of said titanium powder.

7. A method of fabricating a high density alkaline electrochemical capacitor, comprising the steps of:
   fabricating a pair of titanium compound powder electrodes, each having a first and a second surface, said electrodes being fabricated by heating titanium hydride at a temperature above 400° C. while subjecting said titanium hydride to a flow of ammonia vapor at a controlled flow rate;
   attaching a porous separating membrane for containing an electrolyte between said electrodes, said membrane being attached to each said first surface of each electrode; and,
   attaching a conductive termination to each second surface of said powder electrodes.

8. The method of claim 7 wherein said temperature is within the range of about 400° C. to 1100° C.

9. The method of claim 8 wherein said temperature is 700° C.

10. The method of claim 7 wherein said flow of ammonia is about 2 liters per minute per ten-gram quantity of said titanium hydride.

11. The method of claim 7 wherein said conductive termination is fabricated from metal coated with a titanium compound from the group consisting of titanium nitride and titanium carbonitride.

12. The method of claim 7 wherein said conductive termination is fabricated by providing an elastomer, and blending a powder from the group consisting of titanium nitride and titanium carbonitride therein.

13. The method of claim 12 further including the step of coating said conductive termination with a titanium compound from the group consisting of titanium nitride and titanium carbonitride.

14. A method of fabricating a high density alkaline electrochemical capacitor, comprising the steps of:
   fabricating a pair of titanium compound powder electrodes, each having a first and a second surface, said electrodes being fabricated by subjecting titanium hydride to a flow of ionized ammonia vapor at a controlled flow rate;
   attaching a porous separating membrane for containing an electrolyte between said electrodes, said membrane being attached to each said first surface of each electrode; and, attaching a conductive termination to each second surface of said powder electrodes.

15. The method of claim 14 wherein said flow of ammonia is about 2 liters per minute per ten-gram quantity of said titanium hydride.

16. The method of claim 14 wherein said conductive termination is fabricated from metal coated with a titanium compound from the group consisting of titanium nitride and titanium carbonitride.

17. The method of claim 14 wherein said conductive termination is fabricated by providing an elastomer, and blending a powder from the group consisting of titanium nitride and titanium carbonitride therein.

18. The method of claim 17 further including the step of coating said conductive termination with a titanium compound from the group consisting of titanium nitride and titanium carbonitride.

19. A method of fabricating a high density powder electrode comprising the steps of:

creating titanium compound powder by subjecting powdered titanium hydride to a flow of ammonia vapor at a controlled flow rate;

forming said titanium powder into an electrode;

attaching a conductive termination to said electrode, said termination being fabricated from metal coated with a titanium compound from the group of titanium nitride and titanium carbonitride.

20. A method of fabricating a high density powder electrode comprising the steps of:

creating titanium compound powder by subjecting powdered titanium hydride to a flow of ammonia vapor at a controlled flow rate;

forming said titanium powder into an electrode;

attaching a conductive termination to said electrode, said termination being fabricated by providing an elastomer, and blending a powder from the group of titanium nitride and titanium carbonitride therein.

21. The method of claim 20 further including the step of coating said termination with a titanium compound from the group of titanium nitride and titanium carbonitride.

* * * * *